United States Patent [19]
Fischer

[11] Patent Number: 5,839,562
[45] Date of Patent: Nov. 24, 1998

[54] LINEAR DRIVE FOR DISPLACING A COMPONENT, IN PARTICULAR AN AIRCRAFT WING COMPONENT

[75] Inventor: Manfred Fischer, Markdorf, Germany

[73] Assignee: ZF Friedrichshafen AG, Friedrichshafen, Germany

[21] Appl. No.: 860,784

[22] PCT Filed: Jan. 27, 1996

[86] PCT No.: PCT/EP96/00332

§ 371 Date: Jul. 3, 1997

§ 102(e) Date: Jul. 3, 1997

[87] PCT Pub. No.: WO96/24005

PCT Pub. Date: Aug. 8, 1996

[30] Foreign Application Priority Data

Feb. 1, 1995 [DE] Germany .................. 195 03 051.6

[51] Int. Cl.$^6$ .................. F16P 5/00; B64C 13/28
[52] U.S. Cl. .................. 192/143; 192/150
[58] Field of Search .................. 192/223, 223.2, 192/223.3, 44, 56.1, 38, 139, 143, 144, 150, 30 W; 188/134

[56] References Cited

U.S. PATENT DOCUMENTS

| | | |
|---|---|---|
| 3,215,383 | 11/1965 | Wright . |
| 3,667,575 | 6/1972 | Bouhot .................. 192/223 X |
| 4,176,733 | 12/1979 | Twickler .................. 188/134 |
| 4,625,843 | 12/1986 | Maltby et al. .................. 192/223.3 |
| 5,199,538 | 4/1993 | Fischer et al. . |

FOREIGN PATENT DOCUMENTS

| | | |
|---|---|---|
| 39 10 887 C1 | 5/1990 | Germany . |
| WO 90/09921 | 9/1990 | WIPO . |

*Primary Examiner*—Richard M. Lorence
*Attorney, Agent, or Firm*—Davis and Bujold

[57] ABSTRACT

A linear drive for displacing a component, in particular an aircraft wing component, is provided with an input part (1) on the driving side and an output part (4) on the driven side, there being provided between input part (1) and output part (4) an uncoupling device which interrupts a force-locking or a form-locking connection between input part (1) and output part (4) when a predetermined force is exceeded. The input part (1) comprises a freewheel outer part (2) which is connected to the output part (4) via a freewheel inner part (3). Disposed between the freewheel outer part (2) and the freewheel inner part (3) is a tubular freewheel cage (5) with a plurality of pockets (6) which house clamping members (7A, 7B) prestressed by control springs (8) so that they can move in an axial direction. The pockets (6) are provided with inclined ramps (9A, 9B) extending in an axial direction. Spring assembly (10), generating an axial prestress, is disposed between the freewheel inner part (3) and the output part (4).

17 Claims, 5 Drawing Sheets

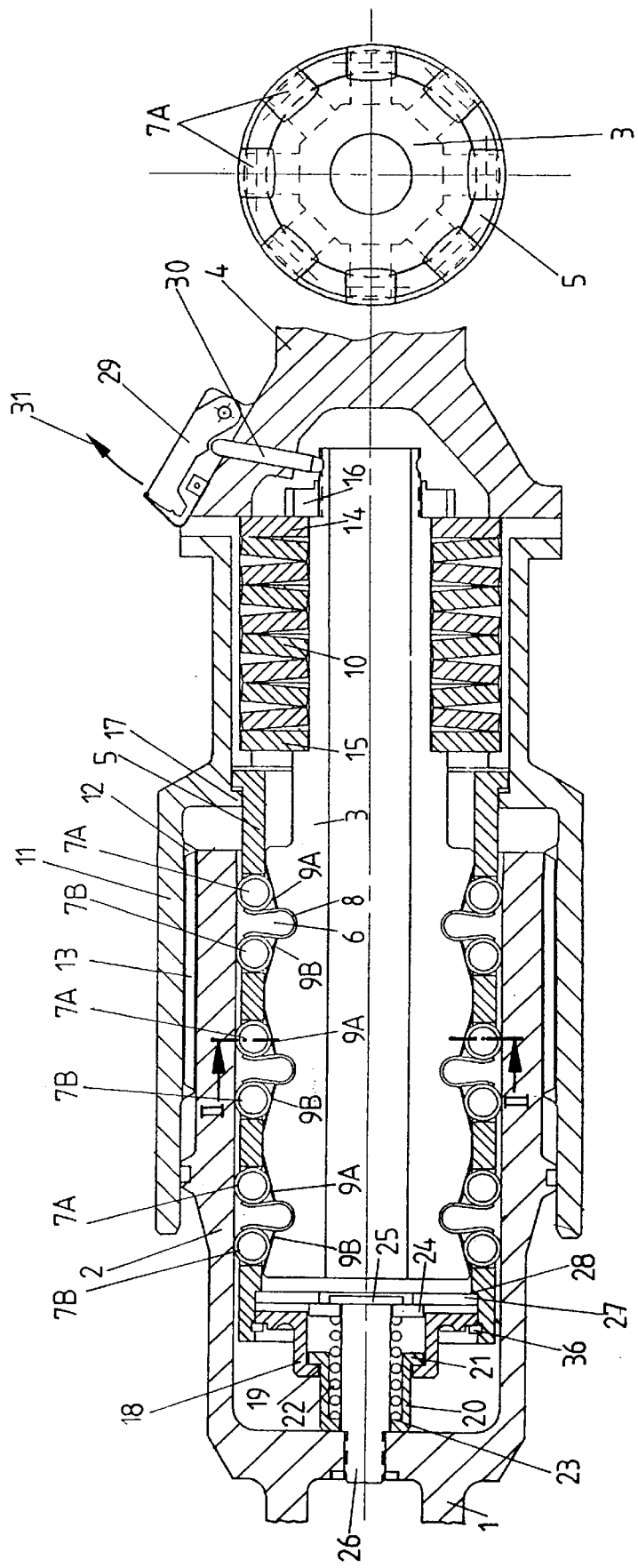

LINEAR DRIVE FOR DISPLACING A COMPONENT, IN PARTICULAR AN AIRCRAFT WING COMPONENT

The invention concerns a linear drive for displacing a component, in particular an aircraft wing component, according to the type defined in more detail in the preamble of claim 1.

Linear drives, by which traction and/or pressure forces are linearly transmitted, are used in various fields. A possible field of use is for aircraft wing components which, when starting or landing, for example, are moved in order to enlarge the lift at low speeds and which enlarge the surface of the hydrofoil and also change the aerodynamics. Crank drives or linear drives are used for driving said wing components such as wing flaps. If a blockage now appears in the guide of a wing component, extremely strong forces are generated which have to be absorbed in the structure of the aircraft. Since the dimension of the aircraft structure is determined by the maximum possible force, the weight also increases therewith.

In designs known in the practice, the force introduced is indirectly limited by limiting the torque of the power train. But the disadvantage of said limitation is that the force amounts to more than double the required value due to the kinetics and also to the dispersions of efficiency.

In WO 90/09921 a driving device having a variable torque-limitation system is described. But it is disadvantageous here that in this already known solution the limitation is relatively inaccurate or distinct dispersions can occur. In addition, the device is relatively dead weight.

Also known in the practice is the limitation of force devices or members in the power flow which are ruined when a predetermined force is exceeded thus constituting a sort of predetermined breakage point. But it is, at the same time, a disadvantage that the transmission of force is terminated therewith and the part must accordingly be repaired before being used again.

Therefore, this invention is based on the problem of providing a linear drive of the kind mentioned above where the force limitation occurs without ruining a structural part and where no disadvantageous weight increase occurs or the structure must be strengthened.

According to the invention, this problem is solved by the steps mentioned in the characteristic part of claim 1.

In normal operation the force is transmitted from the freewheel outer part, via the clamping members, to the inner part and then, via the spring assembly, on to the output part. When a predetermined adjusted value is exceeded, the spring assembly is compressed so that a relative movement occurs, between the freewheel outer part and the output part, which produces an uncoupling of the clamping members. An intended and precise uncoupling of the force transmission is obtained by this device without ruining a structural part.

By an adequate design of the linear freewheel provided in this manner, it can act in both directions, that is, a force limitation can be produced both in traction and in pressure.

Advantageous additional designs and developments of the invention can be seen from the sub-claims and the embodiments that, in principle, are described herebelow with the aid of the drawings. In the drawings:

FIG. 1 is a longitudinal section through the linear drive according to the invention;

FIG. 2 is a cross-section through the freewheel cage along line II—II of FIG. 1;

Figure 3:
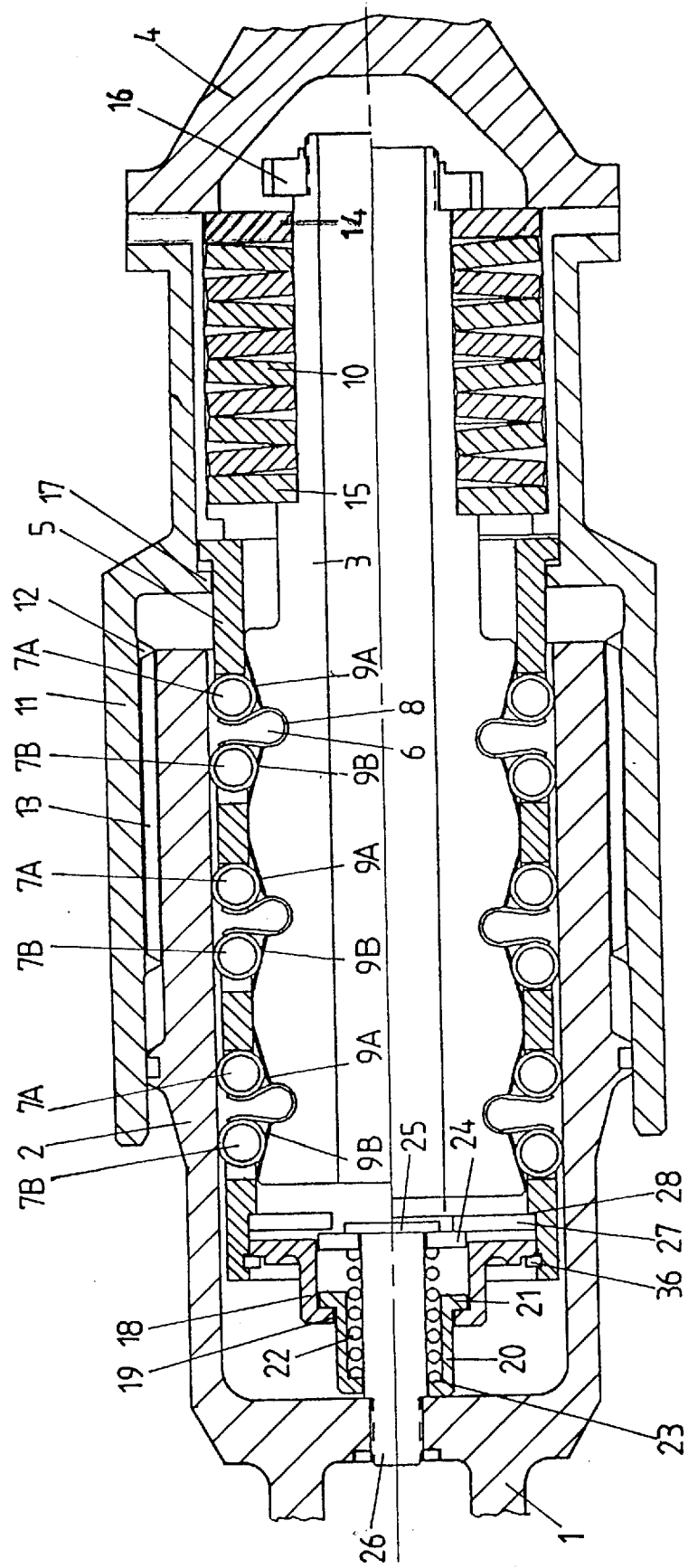
FIG. 3 is the same section of the linear drive according to FIG. 1 at the start of actuation.

The linear drive has an input part 1, a freewheel outer part 2, a freewheel inner part 3 and an output part 4 connected therewith. Between the freewheel outer part 2 and the freewheel inner part 3 is a tubular freewheel cage 5. The freewheel cage 5 is provided with a plurality of pockets 6 in each of which are housed two clamping members, in the form of spherical rollers 7A and 7B, which are prestressed by a clamping member control spring 8 situated therebetween. From FIG. 2 it can be seen that, for example, eight pockets 6 with spherical rollers 7A are uniformly distributed on the periphery of the freewheel cage 5. From FIG. 1 it can be seen that several rows of pockets (three rows in the embodiment) are consecutively disposed in an axial direction, the spherical rollers 7A and 7B in the pocket 6 are separated from each other, in an axial direction, by the clamping member control spring 8 being held under prestress.

From FIG. 1 it can also be seen that the freewheel inner part 3 has inclined ramps 9A and 9B which likewise extend in an axial direction. As can be seen from the figure, ramps 9A and 9B, opposed to one another, one spherical roller 7A and 7B lying as a clamping member on a respective ramp under prestress of the appertaining clamping member control spring 8 are coordinated with each pocket 6.

Instead of the spherical rollers 7A and 7B, other suitable parts can also be used such as self-aligning rollers, cylindrical rollers or also balls. Clamping members with asymmetrical curves or profiles are also possible-depending on the specific use.

The force from the input part 1 flows to the outer part 4 via the freewheel outer part 2, the freewheel cage 5, the freewheel inner part 3 and a spring assembly 10. In addition, an outer sleeve 11 is connected with the output part 4. Between the outer sleeve 11 and the freewheel outer part 2 is situated a guide device which has several axial grooves 12 distributed on the periphery in the outer sleeve 11 and longitudinal ribs or longitudinal webs 13, on the outer periphery of the freewheel outer part 2, interact therewith. The guide device also prevents a rotation of outer sleeve 11 relative to freewheel outer part 2.

The linear drive according to the invention operates as follows. Departing from the normal position shown in FIG. 1, the force flows from the freewheel outer part 2 to the output part 4, via the spherical rollers 7A as clamping members, and from thereon, via the freewheel inner part 3 and the spring assembly 10. If the movement of the output part 4 is now prevented, for example, by icing of a wing flap to be displaced, the preset force in the spring assembly 10 is thus exceeded, and the springs of the spring assembly 10 are compressed. In the embodiment, they are moved to the right by the freewheel inner part 3. The distance between the spring assembly 10 and the freewheel cage 5 is enlarged in an axial direction (see start of actuation in FIG. 3). With increasing excessive force and therewith increasing displacement of the freewheel inner part 3 relative to the freewheel outer part 2, the used spherical rollers 7A are pushed down to the left in the embodiment, by the front walls of the pockets 6 along their ramps 9A and against the prestress of the clamping member control springs 8. In this manner, the spherical rollers become free, the flow of force is interrupted, and the desired freewheel is generated.

Figure 4:
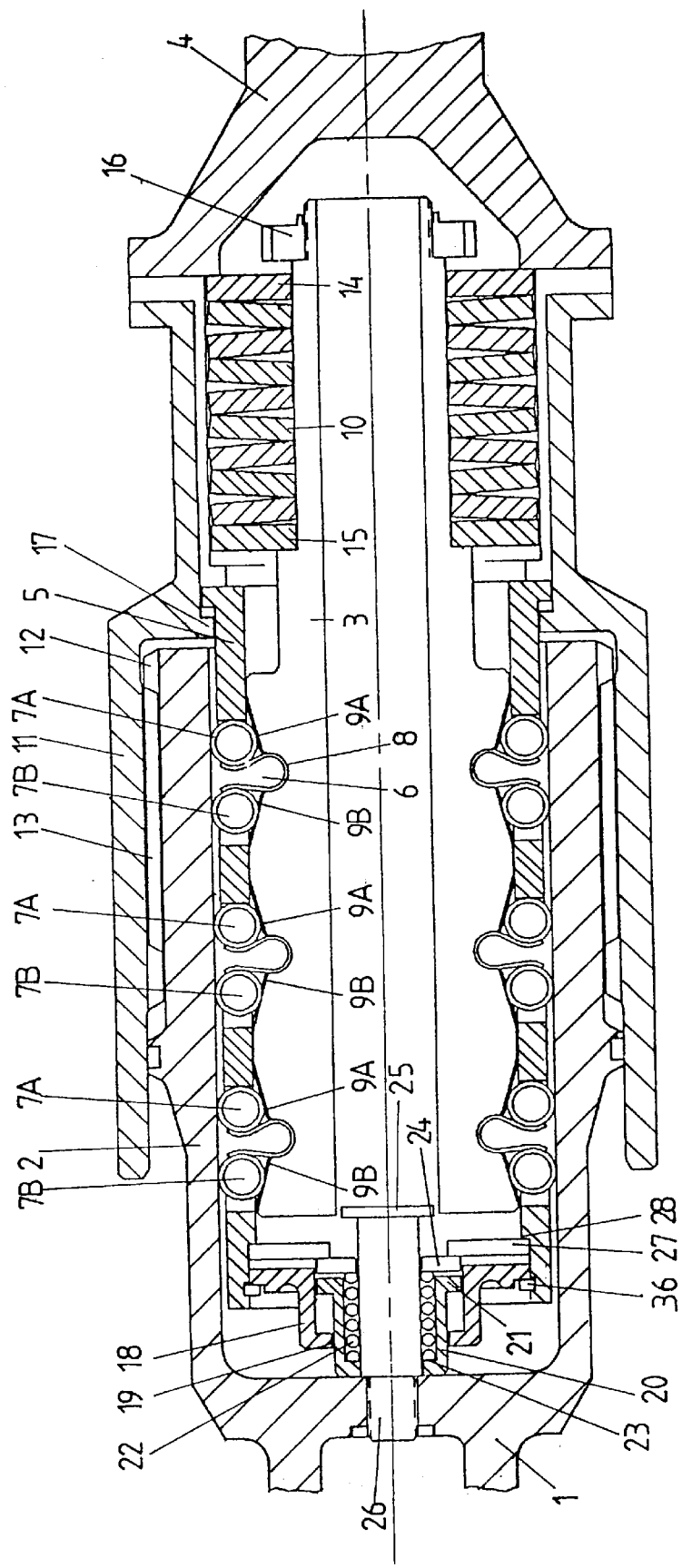
FIG. 4 is the same section of the linear drive according to FIG. 1 at a maximum run-in position.

A maximum run-in position is shown in FIG. 4.

However, the linear drive shown also operates in a reverse direction, that is, with the power flow from the right to the left or from the output part 4 in a direction toward the input part 1. While in the above described power flow from the left to the right, the flow takes place, via a stop ring 15, which abuts against a stop of the freewheel inner part 3, the power flow now goes, via a stop ring 14, which abuts against a stop nut 16 screwed on a front side of the freewheel inner part 3. When a preselected force is exceeded, the spring assembly 10 is, in turn, pressed together by the stop nut 16. If, at the same time, a blockage, in turn occurs, the stop nut 16 compresses the spring assembly. The outer sleeve 11, which is firmly connected with the output part 4, here remains stationary. The outer sleeve 11 has a tubular stop shoulder 17 against which the freewheel cage 5 strikes during the displacement. During the further movement, in this manner, the spherical rollers 7B become disengaged, for they are drawn down to the right along their respective inclined ramps 9B. In this manner, the desired freewheel is also obtained for this power flow.

However, in order to again attain in the respective end positions a resetting or return to the normal position, a special device must be provided, for in the end positions the spherical rollers 7A and 7B, when seeking a return, would otherwise immediately get in gear again as clamping members so that no return to the normal position would be possible anymore.

A spring device is provided for this purpose where the spring is centered and holds the freewheel cage in its normal position or brings it back to said position.

The spring device has an outer ring 18 with an inwardly projecting ring nose 19 and an inner ring 20 with an outwardly projecting ring nose 21 which engages a rear of the ring nose 19. A control spring 22 is stretched between a front wall 23 and a stop ring 24. The stop ring 24 abuts, under prestress by the control spring 22, against a front-side collar 25 of a bolt 26 and can be pressed on a tubular front stop of the freewheel cage 5 by an intermediate ring 27. A snap ring 36 forms a fastening for the outer ring 18 on the side remote from the freewheel cage 5.

Figure 5:
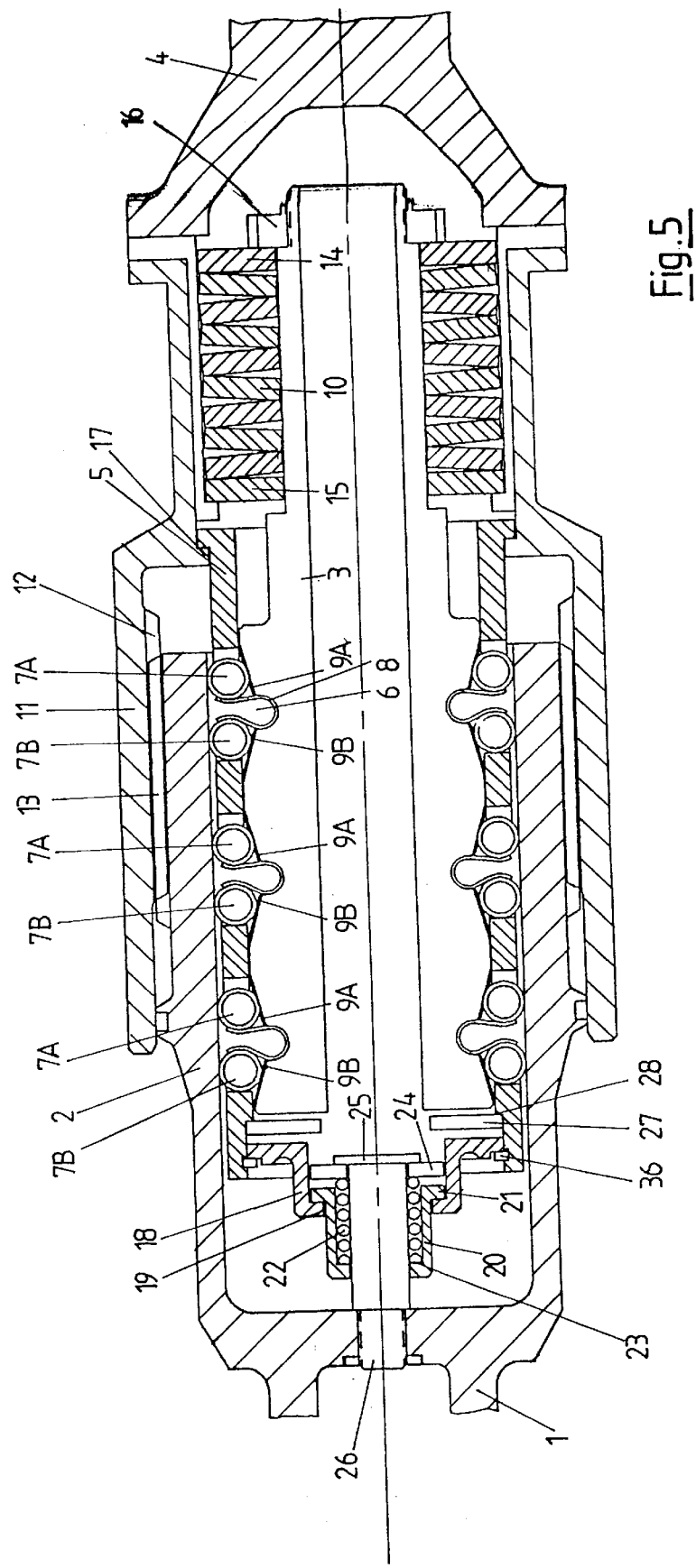
FIG. 5 is the linear drive of FIG. 1 at a maximum full position.

As can be seen from FIG. 5, the inner ring 20 is spaced from the input part 1 or at a distance therefrom. In this position, the inner ring 20 must first be returned by the control spring 22 to a front-side stop on the input part 1. In this manner, the freewheel cage 5 is then again centered with its clamping members.

In the maximum run-in position of FIG. 4, the outer ring 18 has moved from the ring nose 21 of the inner ring 20. In this case, the freewheel cage 5 is again centered to the right by the control spring 22 until reaching the normal position.

This means that unlike the prior art wherein, for example, breaking points exist, multiple points can optionally be tried out whether or not a blockage still exists, therefore no breakage or deformation of the parts occur here.

In the solution according to the invention, a clear travel or a clear displacement, which must be limited only for reasons of needed space, is obtained in the case of an overload. This clear displacement can thus also be used for measuring the displacement path by adequate error detectors. Thus, for example, a release of the force limitation or of the uncoupling device outward by means of an adjustable valve 29 can be indicated and additionally optionally signaled by control members. This device is shown only in principle in FIG. 1. It is thus possible, for example, to provide for a slide rod 30, which is connected with the freewheel inner part 3 and, upon displacement of the freewheel inner part 3, moves the valve 29 in the direction of arrow 31. In this manner, it is possible, in a linear drive which actuates several components, to detect in which component the force was exceeded.

By means of said indicator device, or by any other device, it is also possible to give notice in the sense that a disconnecting device for the drive has been actuated by corresponding control members.

Figure 6:
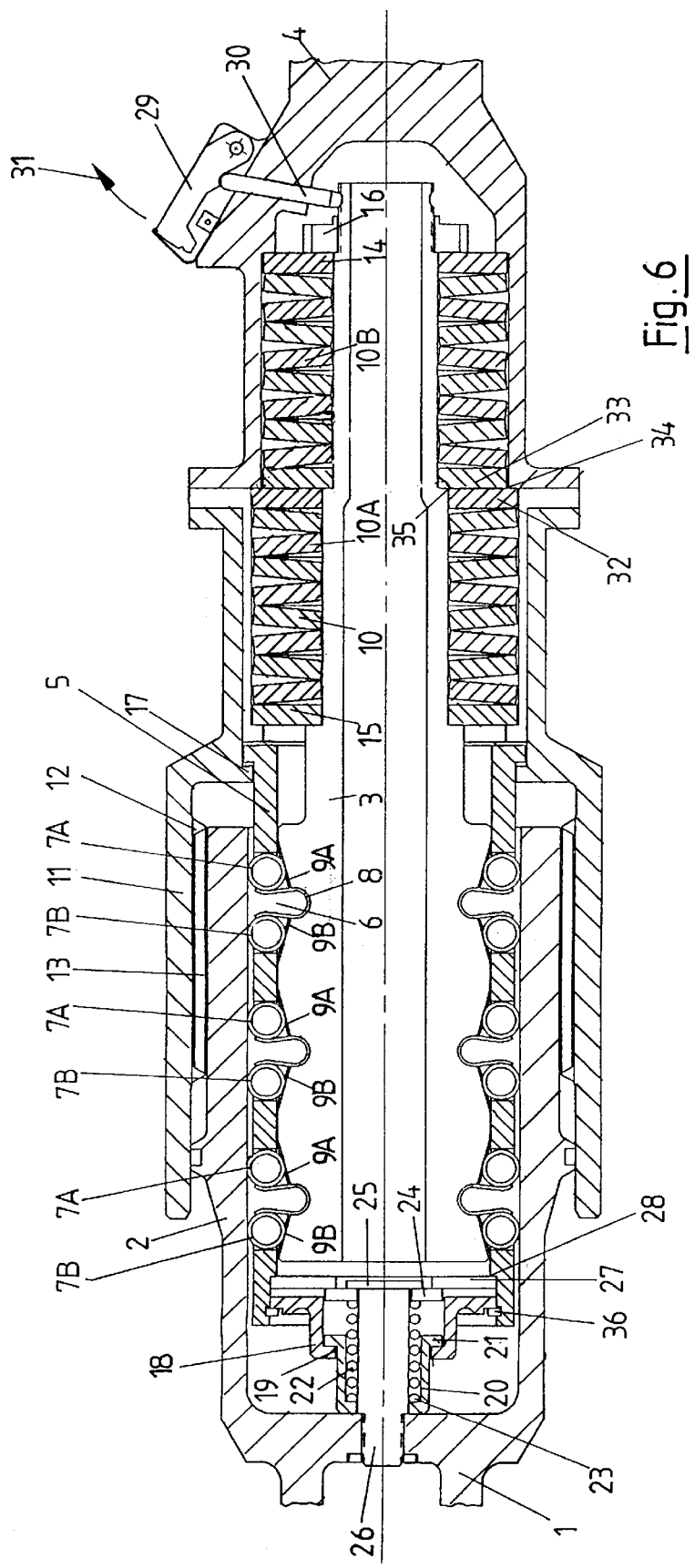
FIG. 6 is a longitudinal section through a linear drive having two spring assemblies.

In FIG. 6, a development of the above described embodiment is shown. The linear drive in this figure operates basically in the same way, wherefore the same reference numerals have been used and the manner of operation has not been discussed in detail herebelow.

The only difference from the above described embodiments is that two spring assemblies 10A and 10B have been provided which have different spring prestresses. During power flow from the right to the left, both spring assemblies 10A and 10B are connected in parallel. The connection of the spring assemblies in series is here weaker than the connection in parallel whereby an asymmetric characteristic line is obtained in both directions of power flow. The causes of said different characteristic lines are, besides the stop rings 14 and 15, two added thrust rings 32 and 33 which are provided and lie between both spring assemblies 10A and 10B. The thrust ring 33 here abuts, under spring prestress, against an annular recess 35 of the freewheel inner part while the stop ring 32 abuts against an annular recess 34 of the output part 4.

The freewheel outer part 2, the freewheel inner part 3 and the freewheel cage 5 are, in general, designed with a circular cross-section. But other cross-sectional shapes, such as a polygonal cross-section, are also evidently possible. Likewise, the inclined ramps 9A and 9B are generally provided in the freewheel inner part, but within the scope of the invention an inverse arrangement is also possible, that is, that the ramps can be situated on the freewheel outer part.

Reference numerals

| | Reference numerals | | |
|---|---|---|---|
| 1 | input part | 18 | outer ring |
| 2 | freewheel outer part | 19 | ring nose |
| 3 | freewheel inner part | 20 | inner ring |
| 4 | output part | 21 | ring nose |
| 5 | freewheel cage | 22 | control spring |
| 6 | pockets | 23 | front wall |
| 7 | spherical rollers | 24 | stop ring |
| 8 | clamping member control spring | 25 | front-side collar |
| | | 26 | bolt |
| 9 | inclined ramps | 27 | intermediate ring |
| 10 | spring assembly | 28 | front stop |
| 11 | outer sleeve | 29 | adjustable valve |
| 12 | axial grooves | 30 | slide rod |
| 13 | longitudinal ribs or webs | 31 | arrow direction |
| | | 32 | additional thrust rings |
| 14 | stop ring | 33 | additional thrust rings |
| 15 | stop ring | 34 | annular recess |
| 16 | stop nut | 35 | annular recess |
| 17 | stop shoulder | 36 | snap ring |

I claim:

1. A linear drive for displacing a component, in particular an aircraft wing component, comprising an input part driving an output part; an uncoupling device being provided between said input part and said output part which interrupts a connection between said input part and said output part when a predetermined force is exceeded;

wherein said input part has a freewheel outer part which is connected, via a freewheel inner part, with said output part; a tubular freewheel cage is situated between said freewheel outer part and said freewheel inner part, said tubular freewheel cage has a plurality of pockets which house clamping members prestressed by control springs so that they can move in an axial direction; and a pair of inclined ramps are coordinated with each pocket situated along said tubular freewheel cage; and at least one spring assembly is disposed between said freewheel inner part and said output part for generating an axial prestress.

2. A linear drive according to claim 1, wherein said connection is a force-locking connection.

3. A linear drive according to claim 1, wherein said connection is a form-locking connection.

4. A linear drive according to claim 1, wherein said freewheel cage is centered in a central position by at spring device.

5. A linear drive according to claim 4, wherein each pocket is provided with said inclined ramps disposed axially homologous to each other.

6. A linear drive according to claim 5, wherein said clamping members are selected from a group consisting of spherical rollers, cylindrical rollers and self-aligning rollers.

7. A linear drive according to claim 5, wherein said clamping members are balls.

8. A linear drive according to claim 7, wherein a guide device is disposed between said freewheel outer part and said output part.

9. A linear drive according to claim 7, wherein a guide device is disposed between said freewheel outer part and a part connected with said output part.

10. A linear drive according to claim 8, wherein said guide device comprise axial grooves with longitudinal ribs located therein.

11. A linear drive according to claim 10, wherein two spring assemblies, each having different spring prestresses, are provided and disposed so as to yield different prestresses relative to one of pressure and traction.

12. A linear drive according to claim 11, wherein the displacement between said freewheel outer part and said freewheel inner part is detectable and can be indicated by an error detector.

13. A linear drive according to claim 12, wherein a disconnectin vice is provided for said linear drive.

14. A linear drive according to claim 9, wherein said guide device comprises axial grooves with longitudinal ribs located therein.

15. A linear drive according to claim 14, wherein two spring assemblies, each having different spring prestresses, are provided and disposed so as to yield different prestresses relative to one of pressure and traction.

16. A linear drive according to claim 15, wherein the displacement between said freewheel outer part and said freewheel inner part is detectable and can be indicated by an error detector.

17. A linear drive according to claim 16, wherein a disconnecting device is provided for said linear drive.

* * * * *